United States Patent [19]
Teal

[11] 3,967,509
[45] July 6, 1976

[54] VARIABLE SPEED SECONDARY PULLEY

[75] Inventor: Richard Donald Teal, Janesville, Wis.

[73] Assignee: Deere & Company, Moline, Ill.

[22] Filed: Jan. 21, 1975

[21] Appl. No.: 543,013

[52] U.S. Cl. .................................. 74/230.17 M
[51] Int. Cl.² .................. F16H 55/52; F16H 11/06
[58] Field of Search ............ 74/230.17 M, 230.17 E, 74/230.17 A, 337

[56] References Cited
UNITED STATES PATENTS

| | | | |
|---|---|---|---|
| 3,616,706 | 11/1971 | Shimamoto | 74/230.17 M |
| 3,625,079 | 12/1971 | Hoff | 74/230.17 M |
| 3,747,721 | 7/1973 | Hoff | 74/230.17 M |
| 3,842,637 | 10/1974 | Wilson | 74/230.17 M |
| 3,884,316 | 5/1975 | Bowers | 74/230.17 M |

*Primary Examiner*—Benjamin W. Wyche
*Assistant Examiner*—A. Russell Burke

[57] ABSTRACT

A variable speed secondary pulley includes a first pulley half and an abutment member connected together and mounted for rotation on and axial movement along a sleeve at axially spaced locations at the opposite sides of a second pulley half immovably fixed to the sleeve. The second pulley half includes a hub provided with axially inclined cam surfaces which are engaged with complementary surfaces provided on a hub of the abutment member. A compression spring is coxially mounted on the sleeve and is compressed between the second pulley half and the abutment member so as to urge the pulley halves toward each other while the cam surfaces serve as a torque responsive means which develops decreasing axial forces in response to decreasing driven shaft torque to effect increasing separation of the pulley halves. Means are provided for manually adjusting the preset torsional load in the spring without dismantling the pulley.

6 Claims, 7 Drawing Figures

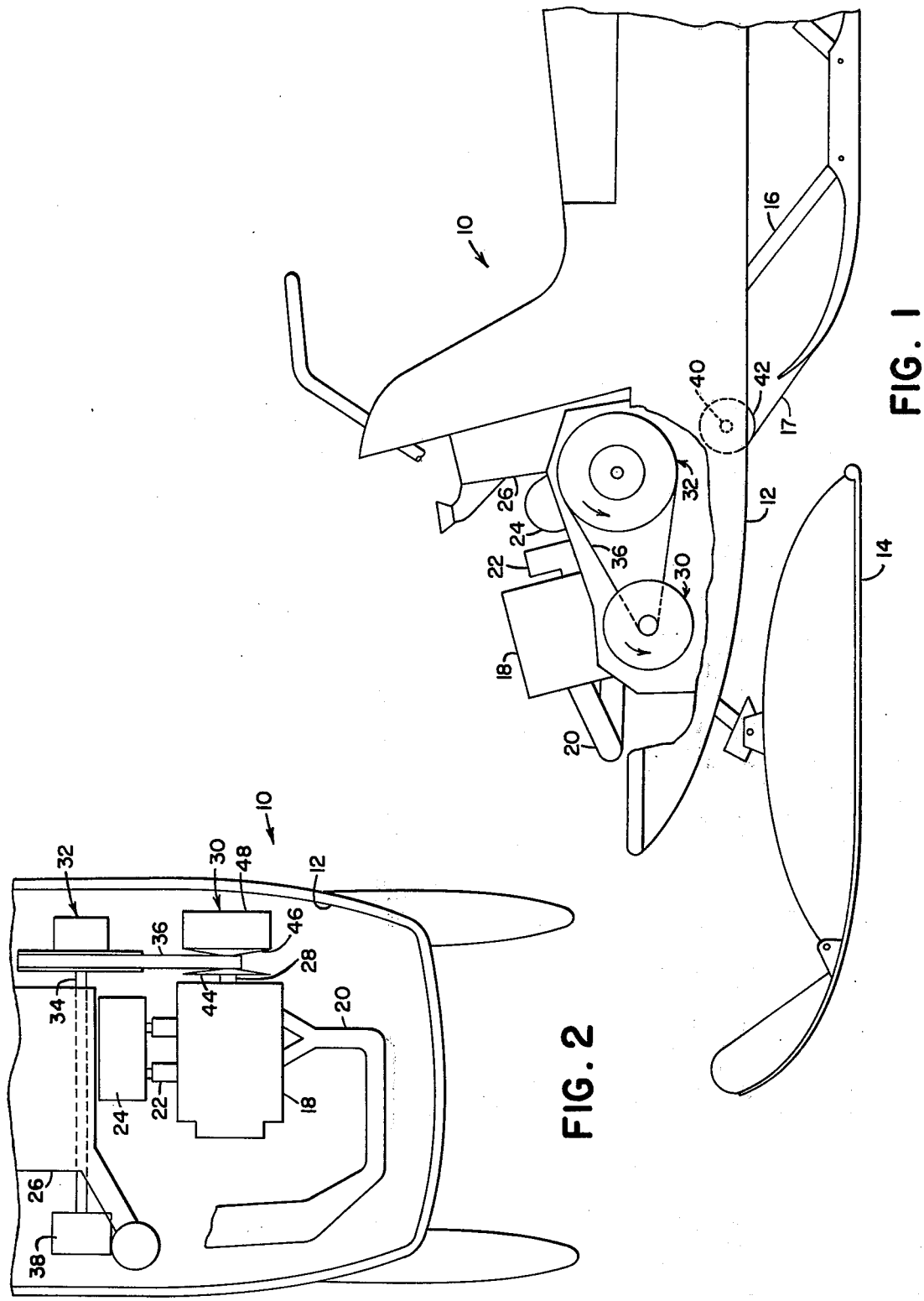

VARIABLE SPEED SECONDARY PULLEY

BACKGROUND OF THE INVENTION

The present invention relates to a variable speed secondary pulley and more particularly relates to a torque sensitive secondary pulley especially adapted for use in a snowmobile transmission.

It is a common practice to drive snowmobiles through means of a transmission including variable speed primary and secondary pulleys which are respectively speed and torque sensitive and mounted on parallel transverse drive and driven shafts. These pulleys each include an axially fixed pulley half and an axially shiftable pulley half and in order to maintain proper alignment of the drive belt disposed about the pulleys, the fixed pulley half of one pulley is disposed inboard of the shiftable pulley half while the fixed pulley half of the other pulley is disposed outboard of the shiftable pulley half.

Heretofore, these primary and secondary pulleys have been constructed such that the speed and torque sensing mechanisms thereof are located on the same side of the fixed pulley half that the movable pulley half is located and the prevailing practice has been to mount the primary pulley such that its speed sensing mechanism is outboard and to mount the secondary pulley such that its torque sensing mechanism is inboard. Since other components of the snowmobile such as the engine, gas tank, carburetor etc. are normally located in the same enclosure that houses the pulleys, the proximity of these other components to the torque sensing mechanism often makes it difficult or impossible to service the torque sensing mechanism or to make manual adjustments thereto without first removing the secondary pulley from the driven shaft.

Also, the danger exists that an operator may come into contact with hot engine or exhaust components in attempting to service or adjust an inboard-located torque sensing mechanism.

Further, the components sharing space with the torque sensing mechanism necessarily have to be arranged to accommodate the latter and these arrangements are often not as operationally desirable as the arrangement that could be made in the absence of the necessity to accommodate the torque sensing means.

SUMMARY OF THE INVENTION

According to the present invention there is provided a novel torque sensitive variable speed secondary pulley.

An object of the invention is to provide a secondary pulley constructed with its fixed pulley half located between its torque sensing mechanism and shiftable pulley half, to thus make the secondary pulley especially adaptable for use in a snowmobile drive including a speed sensitive pulley having its speed sensing mechanism and shiftable pulley half located on the same side of the fixed pulley half.

A more specific object is to provide a secondary pulley as described in the immediately preceding paragraph wherein the torque sensing mechanism includes an abutment member connected to the shiftable pulley half for axial and rotatable movement therewith and to provide the abutment member and a hub of the fixed pulley half with interengaged axially inclined cam or ramp surfaces for developing axial thrust which decreases so as to permit separation of the pulley halves as torque decreases.

These and other objects will become apparent from a reading of the following description in conjunction with the appended drawings.

BRIEF DESCRIPTION OF THE DRAWINGS

FIG. 1 is a schematic left side view of a snowmobile with parts removed and broken away so as to expose a transmission embodying a secondary pulley constructed according to principles of the present invention.

FIG. 2 is a top view of a portion of the snowmobile shown in FIG. 1.

DESCRIPTION OF THE PREFERRED EMBODIMENT

Figure 4:
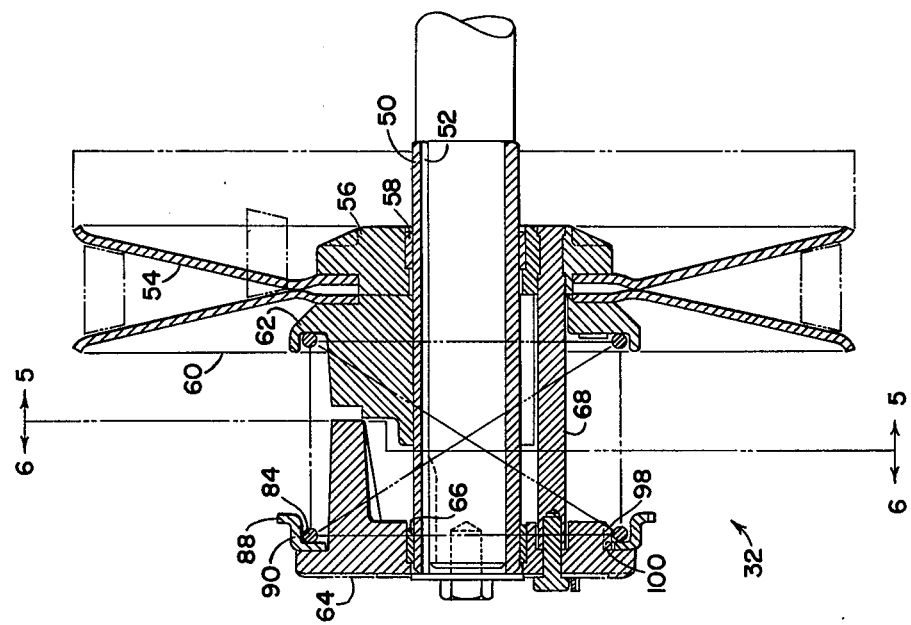
FIG. 4 is a longitudinal sectional view of the secondary pulley taken along the line 4—4 of FIG. 3.
Figure 3:
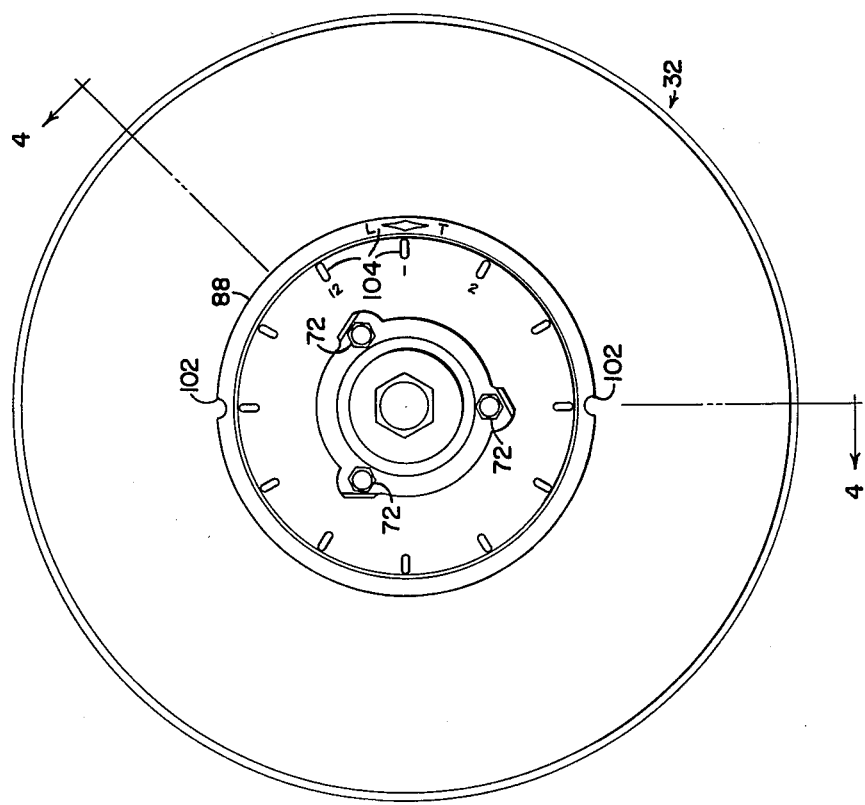
FIG. 3 is a left end view of the secondary pulley as it appears as FIG. 1.
Figure 5:
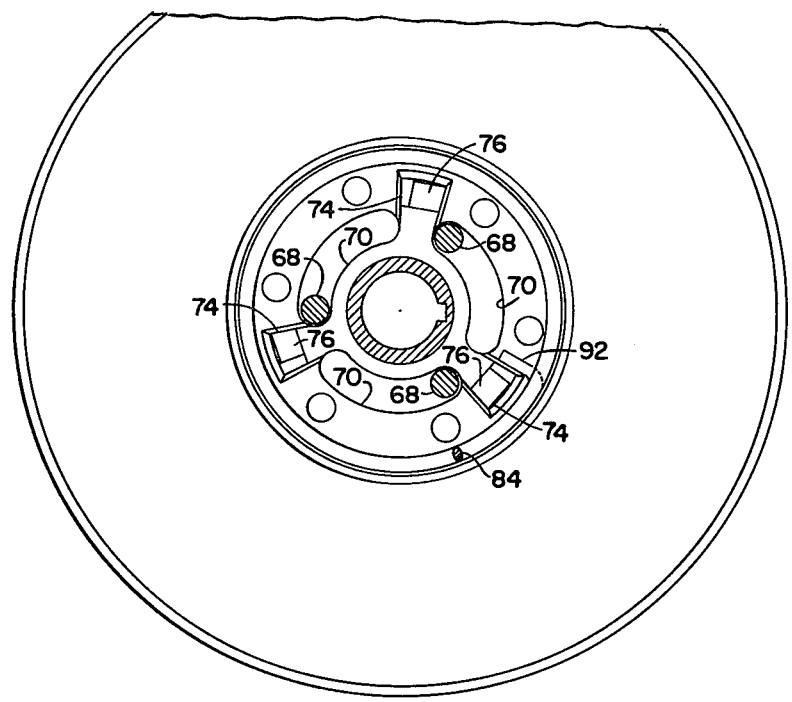
FIG. 5 is a partial transverse sectional view of the secondary pulley taken along line 5—5 of FIG. 4.
Figure 7:
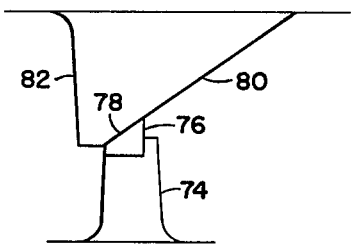
FIG. 7 is an enlarged view showing one of the projections of the fixed pulley half of the secondary pulley engaged with one of the ramp surfaces of the abutment member.
Figure 6:
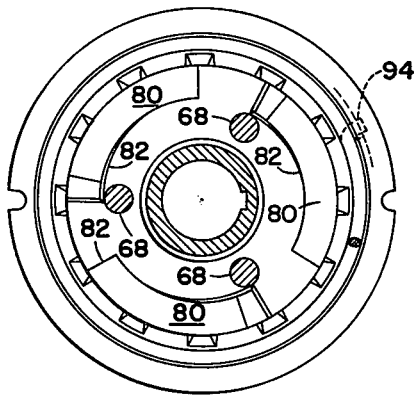
FIG. 6 is a transverse sectional view of the secondary pulley taken along line 6—6 of FIG. 4.

Referring now to FIGS. 1 and 2, therein is shown a snowmobile indicated in its entirety by the reference numeral 10. The snowmobile 10 includes a longitudinally extending frame or body 12 supported on a pair of forwardly located skis 14 and on a rearwardly located track assembly including a suspension 16 and an endless drive track 17. An engine compartment, normally covered by a hood (not shown) is located at the forward end of the snowmobile 10 and contains an internal combustion engine 18 to the forward and rearward sides of which are respectively connected an exhaust pipe 20 and a carburetor 22. Located just behind and coupled to the carburetor 22 is an intake silencer 24 and just behind the latter is a fuel tank 26.

A transmission is connected between a horizontal drive shaft 28, projecting from the left side of the engine 18, and the drive track 17. The transmission includes a speed sensitive variable speed primary pulley 30 mounted on the shaft 28 and a torque sensitive variable speed secondary pulley 32 mounted on a driven shaft 34 journally mounted on the frame 12 in parallelism with the shaft 28. An endless drive belt 36 is trained about the pulleys 30 and 32. Located at the right side of the snowmobile is a chain case which houses a chain drive (not shown) which may be of any known type such as that disclosed in U.S. Pat. No. 3,673,884, granted to Southiere on July 4, 1972. The input to the chain drive is the shaft 34 while the output of the chain drive is a cross shaft 40 on which is mounted a pair of drive sprockets 42 (only one shown) that are drivingly engaged with the drive track 17.

The primary pulley 30 is mounted so that a fixed pulley half 44 thereof is inboard of an axially movable pulley half 46 having a housing 48 secured thereto for movement therewith and enclosing a conventional speed sensing mechanism for shifting the pulley half 46 toward the fixed pulley half 44 in increasing amounts in response to increasing rotational speed of the drive shaft 28. One such speed sensing mechanism is shown in U.S. Pat. No. 3,727,478 granted to Erickson et al on April 17, 1973.

As can best be seen in FIGS. 3-6, the secondary pulley 32 includes a tubular sleeve 50 provided internally with a keyway 52 which receives a piece of key stock (not shown) to hold the sleeve 50 fixed on the driven shaft 34 to thereby form a shaft means. A first pulley half 54 includes a hub portion 56 mounted, through means of a bearing 58 for rotation on and axial movement along an inboard portion of the sleeve 50, as considered when installed as in FIG. 2. Axially adjacent to the first pulley half 54 is a second pulley half 60 including a hub portion 62 immovably fixed on the sleeve 50. A hub-like abutment member 64 is mounted through means of a bearing 66, for rotation on and axial movement along an outboard portion of the sleeve 50. The abutment member 64 is connected to the hub portion 56 of the pulley half 54 for movement with the latter by three equiangularly spaced posts 68, the latter passing through respective arcuate openings or holes 70 extending axially through the hub portion 62 of the second pulley half 60. First ends of the posts 68 are fixedly secured to the hub portion 56 preferably by being placed in a mold for making the hub portion 56 so as to become an integral part of the casting when the hub portion 56 is cast. Second ends of the posts 68 are respectively fixedly held in receptacles formed in the abutment member 64 by means of cap screws 72.

The hub portion 62 of the pulley half 60 is provided with three equiangularly spaced projections 74 which extend axially toward the abutment member 64 and are each provided at their ends with a low friction wear resistant insert 76 having an inclined surface 78 engaged with a respective complementary inclined generally helical ramp or cam surface 80 located on each of three projections 82 of the abutment member 64 extending axially toward the hub portion 60.

Provided for torsionally biasing the inclined surfaces 76 and 80, respectively of the projections 74 and 82, together and for biasing the pulley half 54 towards engagement with the fixed pulley half 60, as shown in FIG. 4, is a coil compression spring 84 mounted so as to act both in compression and torsion between the pulley half 60 and abutment member 64. Specifically, the spring 84 is mounted so as to surround the projections 74 and 82 and has its opposite ends respectively in engagement with the bottom of an annular recess formed in the hub portion 62 so as to open axially toward the abutment member 64, and with a circular indexing plate 88, which is in turn engaged with an annular shoulder or stop surface 90 formed on the abutment member 64. The spring 84 may be selectively adjusted so as to provide a desired torsional preload urging the inclined surfaces 78 against the ramp surface 80 and for this purpose a first terminal end 92 of a wire forming the spring 84 is bent radially inwardly alongside one of the projections 74 of the fixed pulley half 60 while a second terminal end 94 of the wire is bent radially outwardly and extends through an aperture provided in an axially extending flange or rim portion 96 of the indexing plate 88. Also, the plate 88 is normally prevented from rotating about the abutment member 64 by means of a plurality of splines 98 (only one shown) equiangularly arranged about the abutment member 64 and received in complementary notches 100 located in the plate 88. As can best be seen in FIG. 4, the splines 98 extend axially toward the pulley half 60 only a short distance from the shoulder 90.

This permits the torsional preload of the spring 84 to be adjusted by fitting a special tool to notches 102, provided in an outer rim of the plate 88, and moving the plate axially beyond the splines 98 and rotating the plate 88 clockwise (FIG. 3) to increase the load or counterclockwise to decrease the load. Once the plate 88 is in that angular position which corresponds to the desired preload, it is permitted to move back against the shoulder 90 where it once again is restrained from rotation by the spline 98. Appropriate indicia is provided, as at 104, on the abutment member 64 and indexing plate 88 so as to aid in making the desired adjustment.

The operation of the snowmobile transmission and particularly of the secondary pulley 32 is as follows, it being noted that the operation of the primary pulley 30 may be assumed to be the same as that of the primary pulley disclosed in the aforementioned U.S. Pat. No. 3,727,478.

When the snowmobile engine 18 is idling, the shaft 28 rotates at a speed insufficient to activate the unshown speed responsive elements of the primary pulley 30 and the pulley halves 44 and 46 are held fully apart by the compressive resistance of an unshown spring of the pulley 30 such that the belt 36 rides loosely at radially inner portions of the opposed faces of the pulley halves 44 and 46. With the belt 36 loose, no force is transferred thereby to the secondary pulley 32 and the pulley halves 54 and 60 thereof are held fully closed by the unopposed action of the spring 84 so that the belt 36 loosely engages radially outer portions of the opposed faces of the pulley halves 54 and 60. It is to be herenoted that the spring 84 is interposed between the hub 62 of the fixed pulley half 60 and the abutment member 64 such as to offer a compressive resistance to the movement of the member 64 towards the pulley half 60 and hence, of the slifable pulley half 54 away from the pulley half 60; and that the spring 84 is torsionally preloaded between the hub 62 and the member 64 such as to force the cam surfaces 80 against the inclined surfaces 78 thereby resulting in an axial component of force also resisting movement of the member 64, towards the hub 62.

As the engine 18 is speeded up, the unshown speed responsive elements of the primary pulley 30 react to move the pulley half 46 towards the pulley half 44 against the bias of the spring of the pulley 30. This movement of the pulley half 46 results in the belt 36 being wedged radially outwardly on the opposed faces of the pulley halves 44 and 46 and being thereby tensioned and pulled radially inwardly on the opposed faces of the pulley halves 54 and 60 of the secondary pulley 32 so as to force the pulley half 54 away from the pulley half 60 initially in opposition only to the resistive action of the spring 84 but instantaneously thereafter also in opposition to the axial thrust developed at the interfaces of the cam surfaces 80 and the surfaces 76 due to the increased frictional engagement of the belt 36 with the face of the movable pulley half 54 and the resulting increase in the torque delivered to the abutment member 64, via the posts 68. Thus the belt 36 is gripped tighter and tighter by the pulleys 30 and 32 until the force delivered by the belt 36 to the pulley 32 is sufficient to overcome the torque resistance offered by the shaft 34, which resistance incidentally is quite high when the track 17 is at rest. At this time, the transmission will be in a low speed high torque delivery condition with the belt 36 positioned inwardly on the primary pulley 30 and outwardly on the secondary pulley 32, as illustrated in FIGS. 1 and 2.

Once the track 17 begins to rotate, the torque resistance offered by the shaft 34 will decrease resulting in a decrease in the axial thrust developed at the interfaces of the cam surfaces 80 and the surfaces 78 and hence, a decrease in the force resisting movement of the pulley half 54 away from the pulley half 60. Instantaneous with this decrease in force, the belt tension will force the pulley half 54 away from the pulley half 60 which results in the pulley half 54 also being rotated opposite to the driving force of and slipped upon the belt 36 by the action of the cam surfaces 80 moving on the surfaces 78 as the member 64 moves toward the hub 62.

Thus, it will be appreciated that the action of the speed responsive elements of the primary pulley 30 and the action of the torque responsive surfaces 78 and 80 of the secondary pulley 32 work against each other through the medium of the belt 36 so as to continuously effect an equilibrium condition in the transmission and that the drive ratio of the transmission is thus continuously and infinitely varied in response to these two actions to produce a drive ratio suited to the existing operation conditions.

It is herenoted that the bearings 58 and 66 which support the pulley half 54 and abutment member 64 for unitary axial and rotational movements are separated by a distance virtually equal to the axial dimension of the pulley 32. The bearings 58 and 66 thus define a bearing assembly having a length/diameter ratio, which is approximately two to two and one-half times greater than that of conventional secondary pulleys. The significance of this fact is that bearing wear life is directly related to the length/diameter ratio thereof.

Also, it will be appreciated from an inspection of FIG. 2 that the secondary pulley 32 may be mounted closely adjacent other components in the engine compartment, the only limitation being that there be sufficient clearance for the pulley half 54 to move between its extreme outboard and inboard positions respectively shown in solid and broken lines in FIG. 4.

Further, it is to be noted that the indexing plate 88 is located at an outboard location which is easily accessible to an operator thereby making it quite convenient for the torsional preload of the spring 84 to be modified by engaging a tool in the notches 102 provided in the plate 88 and then moving the plate 88 against the spring 84 a distance sufficient to clear the splines 98. Once the plate 88 is free of the splines 98, the tool is used to rotate the plate 88 either clockwise or counterclockwise, as viewed in FIG. 3, to respectively increase or decrease the torsional load. When positioned in the desired new angular position, the plate 88 is allowed to be moved by the spring 84 to again engage the splines 98. It is herenoted that the outboard position of the pulley 32 also permits the operator to make this adjustment without fear of coming into contact with hot components.

I claim:

1. In a variable speed secondary pulley of the type including separate first and second pulley halves mounted adjacent to each other on a shaft means with the first pulley half being immovably fixed to and with the second pulley half being rotatably and axially shiftably mounted on the shaft means, first and second member portions respectively fixed to the first and second pulley halves and respectively including first and second cam surface means and biasing means acting both in compression and torsion between said first and second members in such a manner as to bias the pulley halves together and to torsionally bias the first and second cam surface means together, the improvement comprising: the first member portion being a hub of the first pulley half and the second member portion being an abutment member rotatably and axially shiftably mounted on the shaft means on the opposite side of the first pulley half from the second pulley half; connecting means joining the second pulley half and the abutment member; and said biasing means being interposed between the first member portion and the abutment member for biasing the latter away from the first pulley half and for consequently biasing the second pulley half toward the first pulley half.

2. The secondary pulley defined in claim 1 wherein said biasing means comprises a helical coil compression spring coaxially surrounding the shaft means in radial outward relationship to said first and second cam surface means.

3. The secondary pulley defined in claim 2 wherein said coil compression spring has opposite ends respectively fixed to the first member portion and to an indexing means mounted on said abutment member for angular movement about the shaft means to thereby adjust the preset torsional load of the spring by adjusting the relative angular positions of the opposite ends of the spring; and said abutment member and said indexing means have cooperating connection means for releasably holding the indexing means in desired angular positions.

4. The secondary pulley defined in claim 3 wherein said abutment member is provided with stop surface means facing said spring and spline means extending axially from the stop surface means a preselected distance towards the first pulley half; said indexing means including an annular plate provided with indexing notches normally received on the spline means to prevent rotation of the plate on the abutment member, the plate being movable axially against the force of the spring a distance sufficient to clear the spline means to thus permit rotation of the plate so as to adjust the preset torsional load in the spring to a new value, the plate then being permitted to move against the stop surface with the indexing notches thereof received on the spline means to thus hold the plate in its new angular position.

5. The secondary pulley defined in claim 2 wherein said connecting means includes a plurality of equiangularly spaced posts extending axially from the abutment member to the other pulley half, the posts being located within the coil compression spring and respectively passing through equiangularly spaced arcuate openings provided in the one pulley half.

6. In a variable speed secondary pulley of a type including first and second pulley halves coaxially mounted adjacent each other on a shaft means such that the first pulley half is immovably fixed on the shaft means for rotation therewith and the second pulley half is rotatably and axially shiftably mounted on the shaft means for movement towards and away from the first pulley half, first and second member portions respectively fixed to the first and second pulley halves and respectively including first and second axially inclined surfaces shaped complimentary to and engaged with each other such that rotation of the second member relative to the first member will cause the second member to be wedged away from the first member by the interaction of the first and second axially inclined surfaces, and biasing means acting both in torsion and compression between the first and second member portions in such a manner as to bias the pulley halves together and to torsionally bias the first and second axially inclined surfaces together, the improvement comprising: said second member portion and said second pulley half being located on opposite sides of the first pulley half and interconnected by connecting member means; said second member portion being rotatably and axially shiftably mounted on the shaft means; and said biasing means being interposed between the first pulley half and the second member portion.

* * * * *